Dec. 16, 1969    R. J. WELDON ET AL    3,484,158
METHOD AND APPARATUS FOR PRODUCING STEREOSCOPIC ILLUSIONS
Filed June 30, 1966    2 Sheets-Sheet 1

INVENTORS
ROGER J. WELDON
JOHN T. MYERS
BY Fisher, Christen, Sabol and Caldwell
ATTORNEYS

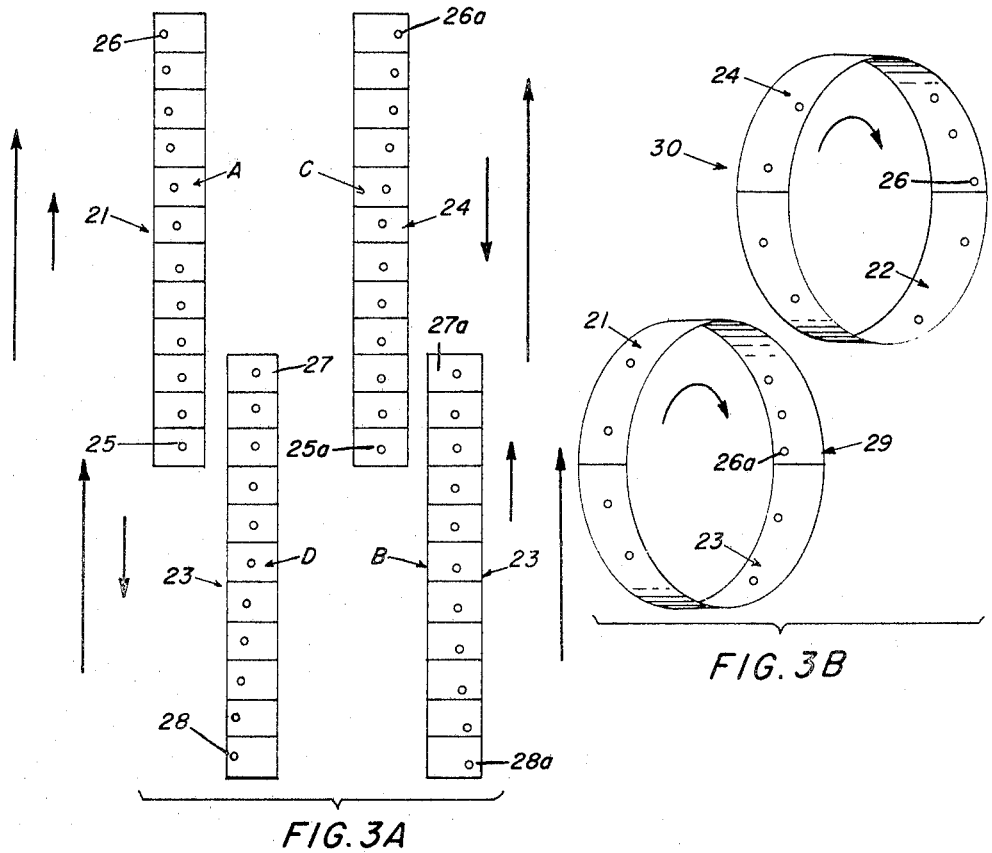
FIG. 3A
FIG. 3B
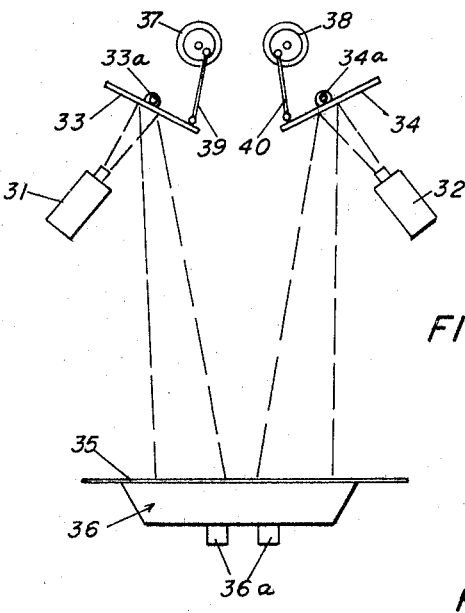
FIG. 4
INVENTORS
ROGER J. WELDON
JOHN T. MYERS
BY Fisher, Christen, Sabol and Caldwell
ATTORNEYS

United States Patent Office 3,484,158
Patented Dec. 16, 1969

3,484,158
METHOD AND APPARATUS FOR PRODUCING STEREOSCOPIC ILLUSIONS
Roger J. Weldon, 6025 San Leandro Drive, Tucson, Ariz. 85715, and John T. Myers, Cambridge, Mass.
Filed June 30, 1966, Ser. No. 561,926
Int. Cl. G03b 35/02, 19/18
U.S. Cl. 352—57          8 Claims

ABSTRACT OF THE DISCLOSURE

A stereoscopic illusion is achieved by producing two sequences of images of an object while moving the camera, or cameras in a common plane normal to the background area of the object and arranging the two sequences in a predetermined relationship to produce pairs of simultaneously viewed images having varying stereo bases.

---

This invention has to do with the production of an apparent motion of objects which are in fact stationary. The motion may be preceived to be lateral, along the line of sight, or some combination of these two motions.

Applications of the invention will be found in those situations in which it is important to detect stationary objects that protrude from a relatively flat background in the frontal plane. The perception of movement in these objects should increase their detectability.

The invention is based upon a principle of stereopsis evolved more than a century ago. Simply stated the principle is that the greater the distance between the positions from which the two pictures of a stereoscopic pair have been taken the greater the apparent depth seen in looking at the pictures apropriately through a stereoscope. For example, two pictures taken from the same position show no stereoscopic depth, while two pictures taken from positions a mile apart show highly exaggerated stereoscopic depth. The distance between the positions from which the two pictures are taken is called the stereo-base.

If the stereo-base could be varied from nothing to a relatively large distance, the apparent depth would change correspondingly from flatness to an exaggerated depth. One way in which this can be done is by operating two moving picture cameras placed side by side and continuing the action of the cameras with their shutters in synchronism as they are moved apart laterally to a relatively large distance. The to finished film strips would then be placed in two projectors to be shown simultaneously with the two projected pictures side by side and of a size to be viewed through a stereoscopic viewer.

Another method is to use an aircraft as a platform from which photographs are taken. The aircraft is assumed to make one sweep across the sky at a fixed altitude and attitude. It will have two fixed cameras pointed vertically dowwnward, which are unattended except for a control which starts and stops them simultaneously. The cameras are started simultaneously when an area to be investigated is reached; they run continuously until the area is past and then stopped.

The apparent motion produced when the two films are viewed in a stereoscope makes it possible to pick out objects in the terrain which might otherwise be obscured in a single picture or a succession of pictures taken with a single camera.

Other objects and advantages will be apparent to those skilled in the art after reading the following specification in connection with the attached drawings, in which:

FIGURE 3A is a diagrammatic plan of the film strips produced by the cameras before being joined.

FIGURE 3B is an isometric view of the film loops formed from the film strips of FIGURE 3A; and FIGURE 4 is a diagrammatic plan view of apparatus for viewing the film loops of FIGURE 3B.

Figure 1:
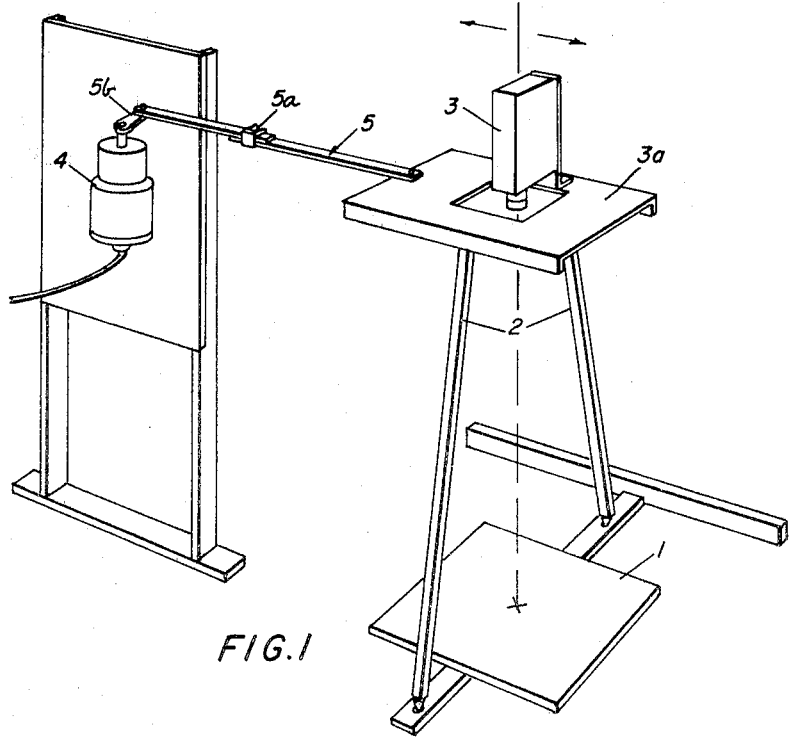
FIGURE 1 is an isometric view of one form of apparatus capable of demonstrating the principles of the invention.

One method of doing this is illustrated by the equipment shown in FIGURE 1. In this arrangement only one camera is used because it can take one side of the stereo pairs at one time and then take the other side later, provided there is no change in the scene photographed. The camera 3 is mounted on the platform 3a, which is supported by the two legs 2 for photographing the scene at table 1. In this equipment the effect is not simply that of moving the cameras apart, but of cycling them back and forth, which produces an induced cycle of movements in the objects photographed. To do this the platform 3a is pivotally connected by crank 5b and rod 5, whose length is adjustable by making it in two sections rigidly clamped together at 5a, to a motor 4 having suitable reduction gearing and in this manner is oscillated back and fourth. Two sequences of photographs are made which are to be stereoscopically projected in predetermined simultaneous pairs. For one sequence of the photographs the rod 5 is shortened so that the platform oscillates from the side nearer the motor to the central upright position. For the other squence of the photographs the rod is lengthened so the platform oscillates from the side away from the motor to the central upright position.

The ends of the two sets of film resulting from the above procedure are spliced to make two film loops. These loops are then projected by two projectors, one arrangement of which is shown in FIGURE 4. The two projectors at 31 and 32 project the image by way of two mirrors, 33 and 34, onto a rear view screen 35. The observer looks at the two images through the eyepieces 36a of a stereoscopic viewer 36. To achieve good induced stereoscopic motion the projectors must be synchronized and the film loops must be exactly equal in length.

The virtual position of a camera is the position of the camera when it took the picture being projected. If the two film loops are so related in the projectors that the pictures taken in the two virtual positions of the camera move exactly in opposition to each other then the images of the objects in the photographic field will be seen to rise and fall in unison, with the taller objects rising faster and further. If the two film loops are phased 180 degrees from this so that the two virtual positions of the camera move in unison from side to side then the objects in the photographic field will be seen to be at a stable height of about half their extreme height in the previous pulsing movement, but they will sway from side to side as if made of flexible materials but fastened to a base.

In one experiment performed with the equipment shown in FIGURE 1, the period of the camera-movement was two cycles per second. The camera, a 16-mm. Bolex, was mounted 51 in. above the background, which was a tweed-textured card-table top. Three amplitudes of oscillating movement of the camera were used: 3, 6 and 12 in. from extreme to extreme, which therefore were the maximum sizes of the stereo base for the three conditions. The objects were 120 stacks of pennies from one to four pennies in height randomly arranged in 10 rows and 12 columns. One stack, the target stack, was increased to 7, 10 or 13 pennies high, according to the experimental treatment. The arrangement gave nine experimental conditions for our exploratory study.

Figure 2:
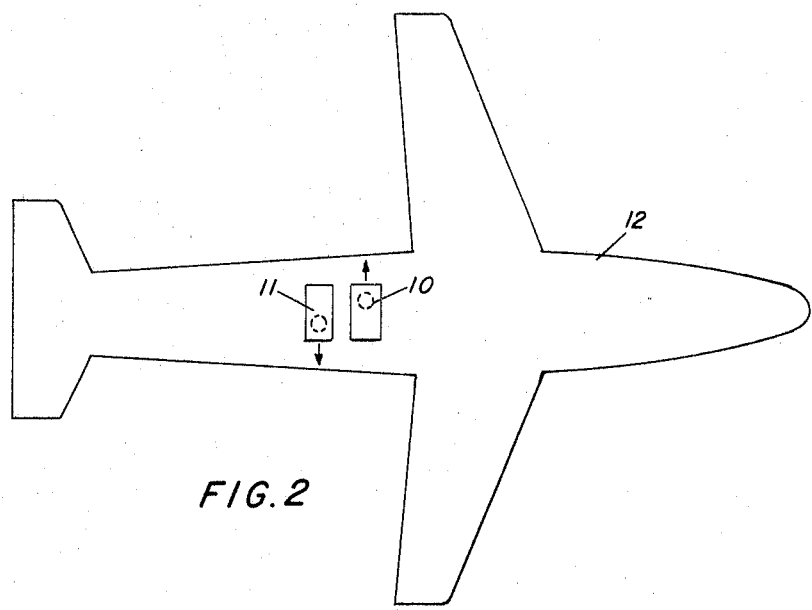
FIGURE 2 is a diagrammatic view of an aircraft provided with cameras scanning the terrain in accordance with the principles of the invention.

Another embodiment of the invention which is particularly useful for the investigation of unknown terrain is shown in FIGURE 2, in which an aircraft, such as an airplane 12 is provided with two cameras 10 and 11 fixed side by side with their lenses pointed straight down. The normal top of one camera 10 is toward the port side of the plane and the normal top of the other camera 11 is toward the starboard side of the plane.

Thus, they are oriented 180 degrees to each other around their optical axes, with the horizontal plane of their normal fields of view in alignment with each other and the path of movement of the aircraft.

By reason of this relative positioning the two film strips produced by the cameras will have exactly the same frames if the cameras are precisely synchronized, but in reverse orders. By cutting out sections of corresponding frames from the two films and splicing them, loops will be made in which when projected will show a lateral transverse back and forth over the same scene.

The production of loops of film which can be simultaneously projected to a viewer for investigating an area of interest using induced stereoscopic motion is shown in FIGURES 3A and 3B. The positive film from the camera is split at the mid-point. Then the first half of the film from one camera is spliced to the latter half of the film from the other camera, but in a manner such that middle frames of each half are adjacent. The same thing is done with the first half of the film from the other camera and the last half of the film from the first camera. Finally, the ends of the resulting spliced strips are joined to form loops which can be continuously projected. (See FIGURE 3B.)

Thus, it will be seen that strips A or 21, and B or 22, are the two halves of film from one camera and strips C or 24, and D or 23 are the two halves from the other camera. Thus, the target image 26, in the first frame of one camera, if the direction of movement of the aircraft was to the left, appears at the left in the first frame of one camera, but the same target 26a appears on the right in the last frame of the other camera.

Since target 26 was photographed during the airplane's approach, and target 26a was photographed during the aircraft's retreat, the effect of viewing these two images simultaneously and stereoscopically is for one eye to see one side of the target at the maximum sighting angle, and for the other eye to see the other side of the target from the other side at the maximum sighting angle. Of course, as the film progresses, the target moves to the center, as at 25 and 25a, at which point the eyes view the target from directly above. Then, passing on to targets 27 and 27a, of the now transposed films, the sighting angle begins to increase for each eye until the frames containing targets 28 and 28a are reached; the view at this point being substantially identical with that of targets 26 and 26a. The short arrows adjacent the four sections of film in FIGURE 3A denote the direction of film exposure while the longer arrows indicate the direction of film movement when viewed.

These loops could be constructed from single prints from each camera if a slight degradation of the induced stereoscopic motion is not objectionable.

When the two loops thus produced are projected appropriately, synchronously and side by side on a rear view screen the area of interest will be seen to oscillate in opposition in the two pictures, between the center and their adjacent margins. Such a pair of moving pictures cannot be seen meaningfully through a stereoscope because the eyes cannot fuse images which have such wide excursions.

The reason for this excursion is that any given target portion of the image will move rapidly from one side to the other as a result of the rapid movement of the aircraft at a fixed altitude. The excursion could be eliminated if the aircraft were to move in a circular path in a vertical plane over a specified object so that the object would always be in the center of the image. This would be difficult to perform, and would be of no value when it is desired to investigate the entire area and no specific target area is known.

To correct for this excessive excursion of the area of interest compensating movements are introduced to maintain the position of the area of interest in the center of the fields of view of the stereoviewer. This can be done in several ways; (1) mount the projectors on turntables and move them; (2) introduce movable mirrors into the light paths between projectors and screen; (3) mount the stereoviewer so that its mirrors, which are customarily on hinged legs, will be free to move; modify the prisms (not shown) of the stereoviewer to permit them to move. Since the mechanism which sets up these compensating movements must be synchronized with the projectors the simplest method is to attach mirrors to the front of each projector and oscillate the mirrors by a power take off from each projector.

An arrangement to provide these compensating movements is shown in FIGURE 4. The mirrors, 33 and 34, are pivotally mounted so as to oscillate about respective axes 33a and 34a, which axes in FIGURE 4 are normal to the plane of the paper. Oscillatory movement of the mirrors in synchronism can be provided by any suitable means such as the motors 37 and 38, connected with the mirrors by adjustable crank and lever means 39 and 40 to provide variations in the amount of angular movement. Motors 37 and 38, as well as the motors (not shown) for driving projectors 31 and 32 may all be synchronous electric motors energized by a common source of alternating current to provide substantial synchronism of exposure and location of areas of interest of successive frames of both film loops. Thus, the total images on the screen 35 coming from the projectors 31 and 32 will move back and forth in such a manner that the area of interest will remain in a relatively constant position with respect to the stereoviewer. The eyes can make some slight adjustment if the constancy is not perfect.

Having disclosed several forms in which the invention may be practiced, it will be evident to those skilled in the art that various modifications and improvements may be made which would come within the scope of the annexed claims.

What is claimed is:

1. Method of producing a stereoscopic illusion of movement of a still object, comprising the steps of taking first and second sequences of images, recording and preparing stereoscopic pairs of images comprising a first sequence of images of said object on a first sequence of successive frames of motion picture film and a second sequence of images of said object on a second sequence of successive frames of motion picture film, the positions at which all said images are recorded being in a plane common to said object and the other recorded images, preparing said two sequences of frames to provide successive views of said object from locations in said plane on one side of a point in said plane in said first sequence and from the other side of said point in the other sequence, said two sequences of images being prepared for stereoscopic viewing by the two eyes of an observer as successive stereoscopic pairs of images having a predetermined cyclical variation of successive stereo bases.

2. The method defined in claim 1, which includes the steps of preparing said two sequences of frames of motion picture film to provide continuous repetitive sequences of pairs of images having stereo bases which progressively increase during one portion of each sequence and progressively decrease during the remaining portion of each sequence.

3. The method defined in claim 1, which includes the steps of providing a camera for recording the images, mounting said camera for movement in an arc whose locus is at said object, moving said camera through a portion of said arc on one side of a point located on said arc to prepare certain of each of said pairs of images, and moving said camera through a corresponding portion of said arc on the other side of said point to prepare the remainder of said pairs of images.

4. The method defined in claim 1, which includes the steps of providing two motion picture cameras for recording the images, mounting said cameras in close juxtaposition to each other on a support with their lenses facing in the same direction and their tops in opposite directions whereby the film in each of the cameras travels in parallel but opposite directions, and moving said support in substantially a straight line path in a plane spaced from and parallel with the plane of the object.

5. The method defined in claim 4, which includes the steps of taking selected lengths of the film produced by said cameras containing successive images, and preparing two closed loops of film, each containing the same number of frames for stereoscopic viewing thereof.

6. The method defined in claim 5, which includes the steps of employing portions of film produced by each of said cameras to prepare each of said closed loops.

7. The method defined in claim 6, which includes the steps of employing an equal number of frames produced simultaneously by said cameras to prepare said closed loops, each of said loops including the initial frames produced by one camera and the latter frames produced by the other camera.

8. The method defined in claim 7, which includes the steps of using one-half of the frames produced by each camera for said initial frames of each loop, the latter frames of each said loop including the remaining frames from the other camera, the sequence of arrangement of said latter frames in each loop being in the reverse order in which they were prepared by the cameras.

References Cited

UNITED STATES PATENTS

| | | | |
|---|---|---|---|
| 2,013,842 | 9/1935 | Savage | 352—57 |
| 2,380,088 | 7/1945 | Tickell. | |
| 2,969,005 | 1/1961 | Blackstone | 95—12.5 |
| 3,225,651 | 12/1965 | Clay. | |
| 3,251,283 | 5/1966 | Wood | 95—12.5 |

FOREIGN PATENTS

| | | |
|---|---|---|
| 296,391 | 8/1928 | Great Britain. |
| 319,406 | 9/1929 | Great Britain. |

JULIA E. COINER, Primary Examiner

U.S. Cl. X.R.

95—12.5; 352—53, 132